(No Model.)

J. McIVER.
BALING PRESS.

No. 276,615.

2 Sheets—Sheet 1.

Patented May 1, 1883.

WITNESSES

James McIver,
INVENTOR
by
Attorneys.

(No Model.) 2 Sheets—Sheet 2.

J. McIVER.
BALING PRESS.

No. 276,615. Patented May 1, 1883.

WITNESSES

James McIver,
INVENTOR

UNITED STATES PATENT OFFICE.

JAMES McIVER, OF HOUSTON, TEXAS.

BALING-PRESS.

SPECIFICATION forming part of Letters Patent No. 276,615, dated May 1, 1883.

Application filed February 21, 1883. (No model.)

*To all whom it may concern:*

Be it known that I, JAMES McIVER, a citizen of the United States, residing at Houston, in the county of Harris and State of Texas, have invented a new and useful Baling-Press, of which the following is a specification, reference being had to the accompanying drawings.

This invention relates to presses for baling hay, cotton, and the like; and it has for its object to furnish a simple, durable, and convenient press which may be easily and effectively operated, as will be hereinafter fully described, and particularly pointed out in the claims.

Figure 1:
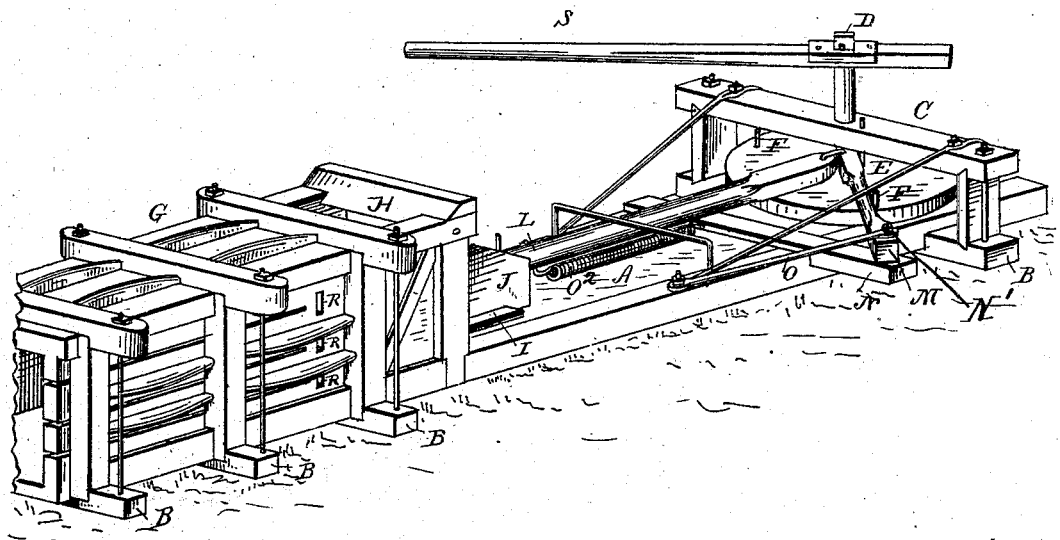
Figure 2:
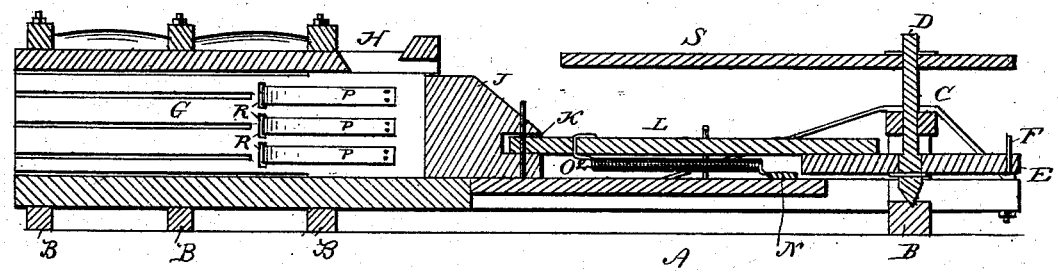
Figure 3:
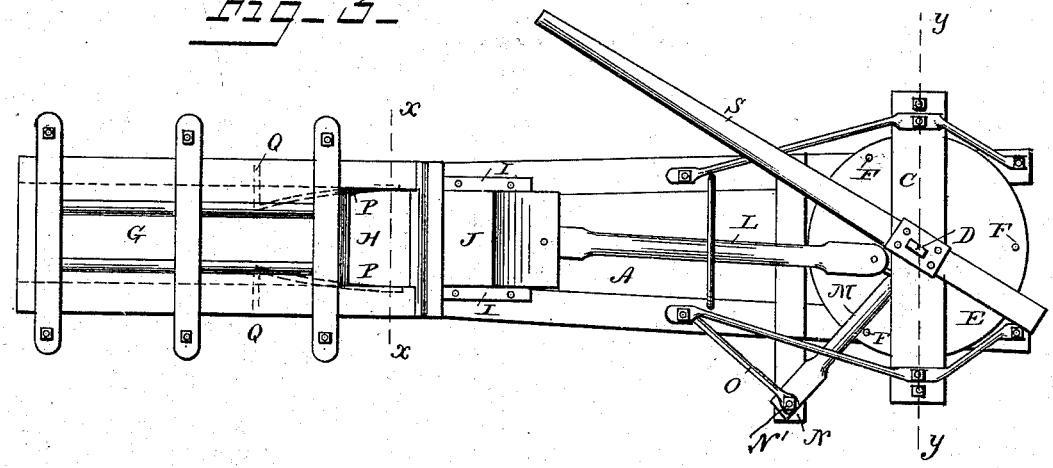
Figure 4:
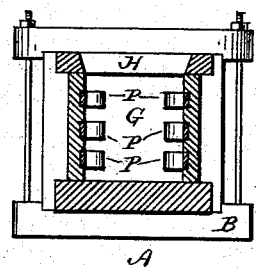
Figure 5:
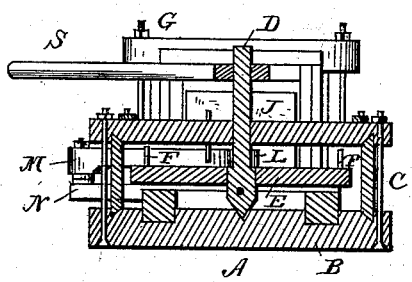

In the drawings hereto annexed, Figure 1 is a perspective view of my improved baling-press. Fig. 2 is a longitudinal vertical sectional view of the same. Fig. 3 is a top plan. Fig. 4 is a vertical transverse sectional view on the line $x\ x$ in Fig. 3, and Fig. 5 is a vertical transverse sectional view on the line $y\ y$ in Fig. 3.

The same letters refer to the same parts in all the figures.

In the drawings, A represents the base of my improved baling-press, which is constructed of suitable beams mounted upon transverse sills or foot-pieces B B. At the front end of the base A is constructed a vertical frame, C, having bearings for a vertical shaft, D, carrying a horizontal wheel or disk, E, the upper side or face of which is provided, near its periphery, with a series of equidistant upwardly-projecting pins or studs, F F, of which there may be one, two, three, or any desired number, three being, however, the average number in a medium-sized machine.

At the rear end of the base, and longitudinally upon the same, is constructed the press-box G, which is to be of such a length that it will easily accommodate two bales of hay (or other material) besides the one which is being pressed. The rear end of the press-box is open, so that the finished bales will be gradually pushed out as the bale which is being made increases in size, the said finished bales serving as a backing against which the new bale is being pressed. The top or upper side of the press-box is provided at its front end with an opening, H, which may be equipped with a suitably-constructed hopper, through which the material to be pressed may be admitted into the press-box.

Suitable guides, I I, are provided upon the base, between which slides the follower J, which fits in the press-box, as shown. The outer end of said follower has a recess, K, in which is pivoted a rod, L, extending forwardly, and connected at its front end with one end of a lever, M, the other end of which is pivoted to a bracket, N, projecting laterally from the base. This lever is actuated by the pins or studs F upon the wheel or disk E, which, when the said wheel revolves, strike the said lever, forcing it in a rearward direction, and thus forcing the follower into the press-box. The upper end of the pin N', by which the lever M is pivoted, is connected by a brace-rod, O, with the base of the machine for the purpose of enabling the said pivot-pin to resist successfully the strain to which it will be subjected. A spring, $O^2$, may be employed for withdrawing the follower from the press-box when released from the action of the wheel E through the medium of the lever, as described.

To the sides of the press-box, near the front end of the latter, are secured springs P P, extending rearwardly, as shown, and having arms or brackets Q at their rear ends, which project laterally outwardly through slots R in the sides of the box. These springs, it will be seen, will yield readily to the pressure of the follower when the latter enters the box. When the follower is withdrawn the spring-brackets will arrest the hay or other material which has been just pushed back into the press-box and prevent it from springing out under the hopper.

The shaft D has at its upper end a lever or sweep, S, to which a horse may be hitched for operating the machine.

I claim as my invention and desire to secure by Letters Patent of the United States—

1. The combination of the base, the press-box, the frame at the front end of the base, the vertical shaft journaled in said frame, the horizontal wheel or disk having upwardly-projecting pins or studs, the longitudinally-reciprocating follower having a pivoted stem, and the lever pivoted to the front end of said stem and to the base of the machine, all arranged and operating substantially as set forth.

2. The combination of the base, the press-box, the longitudinally-reciprocating follower having pivoted stem, the horizontal wheel having upwardly-projecting pins or studs, a bracket projecting laterally from the base, a lever pivoted to said bracket by a vertical pin, and having its inner end pivoted to the follower-stem, and a brace connecting the upper end of the pivoting-pin with the base of the machine, as and for the purpose set forth.

In testimony that I claim the foregoing as my own I have hereto affixed my signature in presence of two witnesses.

JAMES McIVER.

Witnesses:
 JNO. A. SCHAUB,
 F. BONN.